United States Patent
Ekart et al.

(10) Patent No.: US 8,079,158 B2
(45) Date of Patent: Dec. 20, 2011

(54) PROCESS FOR SEPARATING AND DRYING THERMOPLASTIC PARTICLES UNDER HIGH PRESSURE

(75) Inventors: Michael Paul Ekart, Kingsport, TN (US); Andrew S. Hudson, White Oak, TX (US); Raymond Isaac, Gray, TN (US); Luciano Dalmacio Samitier, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 1119 days.

(21) Appl. No.: 11/134,946

(22) Filed: May 23, 2005

(65) Prior Publication Data

US 2006/0042113 A1   Mar. 2, 2006

Related U.S. Application Data

(60) Provisional application No. 60/606,729, filed on Sep. 2, 2004.

(51) Int. Cl.
   *F26B 5/08* (2006.01)
(52) U.S. Cl. ............... 34/320; 34/325; 34/405; 34/413; 34/58
(58) Field of Classification Search .............. 34/320, 34/325, 362, 405, 413, 58, 59, 397, 349
   See application file for complete search history.

(56) References Cited

U.S. PATENT DOCUMENTS

| | | | |
|---|---|---|---|
| 2,401,754 A * | 6/1946 | Green | 528/499 |
| 3,266,165 A | 8/1966 | Apostle et al. | |
| 3,458,045 A | 7/1969 | Dudley | |
| 3,495,341 A * | 2/1970 | Wagner et al. | 34/397 |
| 3,749,539 A | 7/1973 | Galbreath et al. | |
| 3,753,637 A | 8/1973 | Gasior et al. | |
| 4,123,207 A | 10/1978 | Dudley | |
| 4,218,323 A | 8/1980 | McCracken | |
| 4,251,198 A | 2/1981 | Altenburg | |
| 4,300,877 A | 11/1981 | Andersen | |
| 4,421,470 A | 12/1983 | Nakamura | |

(Continued)

FOREIGN PATENT DOCUMENTS

CA     2340358    1/2001

(Continued)

OTHER PUBLICATIONS

The Kreyenborg Group—Short Survey, Sales Brochure, Aug. 2004.

(Continued)

*Primary Examiner* — Kenneth B Rinehart
(74) *Attorney, Agent, or Firm* — Oblon, Spivak, McClelland, Maier & Neustadt, L.L.P.

(57) ABSTRACT

A process for feeding a slurry of thermoplastic synthetic polymer particles such as polyethylene terephthalate homopolymers and copolymers in combination with a liquid such as water at a liquid temperature greater than the normal boiling point of the liquid, under a pressure greater than the vapor pressure of the liquid at the liquid temperature, into a separation zone such as a centrifugal dryer, and within the separation zone:
   a. separating the liquid from the particles, and
   b. drying the particles;
while under a high pressure equal to or greater than the vapor pressure of the liquid. There is also provided a process for decoupling the dried particles from the separation zone to an atmosphere having a pressure less than the vapor pressure of the liquid while maintaining the vapor pressure of the particles prior to decoupling equal to or above the vapor pressure of the liquid at the liquid temperature.

16 Claims, 1 Drawing Sheet

U.S. PATENT DOCUMENTS

| | | | |
|---|---|---|---|
| 4,500,271 | A | 2/1985 | Smith |
| 4,565,015 | A | 1/1986 | Hundley, III |
| 4,728,275 | A | 3/1988 | DiLullo et al. |
| 4,728,276 | A | 3/1988 | Pauley et al. |
| 5,059,103 | A | 10/1991 | Bruckmann et al. |
| 5,187,880 | A | 2/1993 | Rudolph |
| 5,188,856 | A * | 2/1993 | Hinz et al. .............. 426/465 |
| 5,252,218 | A | 10/1993 | Muraldihara et al. |
| 5,265,347 | A | 11/1993 | Woodson et al. |
| 5,280,913 | A | 1/1994 | Sirk |
| 5,310,515 | A | 5/1994 | Jurgen et al. |
| 5,473,826 | A * | 12/1995 | Kirkbir et al. .............. 34/405 |
| 5,611,150 | A * | 3/1997 | Yore, Jr. .............. 34/58 |
| 5,611,983 | A | 3/1997 | Ma et al. |
| 5,628,947 | A | 5/1997 | Keilert |
| 5,766,533 | A | 6/1998 | Mears et al. |
| 5,785,869 | A | 7/1998 | Martinson et al. |
| 5,895,617 | A | 4/1999 | Mizuguchi et al. |
| 5,942,170 | A | 8/1999 | Peitz |
| 5,987,769 | A * | 11/1999 | Ackerman et al. .............. 34/58 |
| 6,332,765 | B1 | 12/2001 | Spelleken |
| 6,430,842 | B1 | 8/2002 | Hauch |
| 6,505,416 | B2 | 1/2003 | Sandford |
| 6,551,087 | B1 | 4/2003 | Martin |
| 6,551,643 | B2 | 4/2003 | Bernata et al. |
| 6,589,306 | B2 | 7/2003 | Ronning et al. |
| 6,592,350 | B1 | 7/2003 | Chszaniecki |
| 6,655,039 | B2 | 12/2003 | Hultsch |
| 6,720,406 | B1 | 4/2004 | Elsner et al. |
| 6,739,457 | B2 | 5/2004 | Humphries, II et al. |
| 6,754,979 | B2 * | 6/2004 | Ludwig et al. .............. 34/372 |
| 7,192,545 | B2 | 3/2007 | Ekart et al. |
| 7,470,370 | B2 | 12/2008 | Parker et al. |
| 2002/0171159 | A1 | 11/2002 | Matthaei et al. |
| 2003/0000100 | A1 * | 1/2003 | Ludwig et al. .............. 34/62 |
| 2005/0065318 | A1 | 3/2005 | Jernigan et al. |
| 2005/0085620 | A1 | 4/2005 | Bruckmann |
| 2005/0154183 | A1 | 7/2005 | Ekart et al. |
| 2007/0062872 | A1 | 3/2007 | Parker et al. |
| 2007/0135614 | A1 | 6/2007 | Ekart et al. |

FOREIGN PATENT DOCUMENTS

| | | |
|---|---|---|
| CA | 2381965 | 2/2001 |
| DE | 1953741 | 5/1971 |
| DE | 2819443 | 11/1979 |
| DE | 4330078 | 3/1994 |
| DE | 19703353 | 8/1998 |
| DE | 19848245 | 5/2000 |
| DE | 10333648 | 9/2004 |
| JP | 2229560 | 9/1990 |

OTHER PUBLICATIONS

BKG Underwater Pelletizing Systems, Sales Brochure, Sep. 2004.
Carter Day Sales Brochure, Sep. 1, 1999 [online] [retrieved before Aug. 25, 2005] Retrieved from the Internet <URL:http://www.carterday.com/media/petrobrochure.pdf>.
BKG Bruckmann & Kreyenborg Granuliertechnik GmbH—Pelletizing Systems, 2004 Munster, Germany [online] [retrieved before Aug. 25, 2005] Retrieved from the Internet <URL:http://www.kreyenborg.com/en/bkg/>. A publication date of Jul. 19, 2003 confirmed [online] [retrieved on Nov. 18, 2008]. Retrieved from the Internet <URL:http://web.archive.bibalex.org/web/20050114064429/www.kreyenborg.com/en/bkg/produkte/master.php>. Publication date link retrieved from the Internet <URL:http:web.archive.bibalex.org/web/*hh__/kreyenborg.com>.
Centrifugal Dryer Process, Gala Industries, 2003, Eagle Rock, Virginia [retrieved before Aug. 25, 2005]. Retrieved from the Internet <URL:http://www.gala-industries.com/centridry.htm>. A publication date of Feb. 8, 2003 confirmed [online] [retrieved on Nov. 14, 2008]. Retrieved from the Internet <URL:http://web.archive.bibalex.org/ web/20030605103823/www.gala-industries.com/centridry.htm>. Publication date link retrieved from the Internet <URL: http://web.archive.bibalex.org/web/*/http://gala-industries.com>.
Plastic scraps drying, Leda, [online] [retrieved before Aug. 25, 2005] Retrieved from the Internet <URL:http://www. ledarecycling.it/menu/plastic__scraps__drying.htm>. A publication date of May 24, 2004 confirmed [online] [retrieved on Dec. 2, 2008]. Retrieved from the Internet <URL:http://web.archive.bibalex.org/web/20040603040107/ ledarecycling.it/menu/plastic__scraps__drying.htm>. Publication date link retrieved from the Internet <URL:http://web. archive.bibalex.org/web/*/http://www.ledarecycling.it>.
Process Description, BKG Underwater pelletizing system, Regis Machinery [online] [retrieved before Aug. 25, 2005]. Retrieved from the Internet <URL:http://www.regismachinery.co.uk/Equipment/BKG/Process__Description/ process__description.html>. A publication date of Jul. 14, 2003 confirmed [online] [retrieved on Dec. 2, 2008]. Retrieved from the Internet <URL:http://web.archive.bibalex.org/web/20030715200841/regismachinery.co.uk/ Equipment/BKG/Process__Description/process__description.html>. Publication date link retrieved from the Internet.
Process Dryers Specifications, GlobalSpec, Troy, New York [online] [retrieved before Aug. 25, 2008] Retrieved from the Internet <URL:http://process-equipment.globalspec.com/ Specifications/ Processing__Equipment/ Heat__Transfer__Equipment/Process__Dryers>. A publication date as early as Aug. 8, 2003 confirmed [online] [retrieved on Dec. 2, 2008] Retrieved from the Internet <URL:http://web.archive.bibalex.org/ web/20040625110450/process-equipment.globalspec.com/Specifications/Processing__Equipment/.
USPTO Office Action dated Aug. 18, 2009, in U.S. Appl. No. 11/501,606.
USPTO Office Action dated Apr. 16, 2010 in copending U.S. Appl. No. 11/501,606.
International Search Report and Written Opinion of the International Searching Authority for Corresponding PCT Application PCT/US2006/030688 dated Sep. 15, 2008.
International Search Report and Written Opinion of the International Searching Authority for Corresponding PCT Application PCT/US2006/035364 dated Jan. 15, 2007.
Notice of Allowance dated Sep. 8, 2010 in copending U.S. Appl. No. 11/501,606.

* cited by examiner

FIGURE 1

PROCESS FOR SEPARATING AND DRYING THERMOPLASTIC PARTICLES UNDER HIGH PRESSURE

CROSS REFERENCE TO RELATED APPLICATIONS

This application claims the benefit of U.S. Provisional Application No. 60/606,729 filed Sep. 2, 2004, the entirety of which is hereby incorporated by reference.

FIELD OF THE INVENTION

The invention pertains to processes and apparatus for separating a slurry comprised of polymeric particles such as polyester particles from a liquid such as water and drying the particles while maintaining the pressure on the particles above the vapor pressure of the liquid.

BACKGROUND OF THE INVENTION

Thermoplastic synthetic polymer particles, such as polyester (or copolyester) pellets, are generally supplied to converters in a semi-crystalline form. Converters desire to process semi-crystalline pellets rather than amorphous pellets because the semi-crystalline pellets can be dried at higher temperatures without agglomerating. A typical commercial process for providing crystallized pellets involves forming the polyester polymer via melt phase polymerizing up to an It.V. ranging from about 0.5 to less than 0.70, extruding the melt into strands, quenching the strands, cutting the cooled polymer strands into solid amorphous pellets, which are then often stored for entry into a second phase known as solid state polymerization to further increase the It.V. of the pellets suitable for end use applications. The pellets are re-heated to above their $T_g$ and then crystallized under a flow of hot nitrogen gas or hot air to prevent the pellets from sticking in the solid stating polymerization reactor, and subsequently further heated in the solid state to higher temperatures under a nitrogen purge (or vacuum) in order to continue to build molecular weight or It.V. (i.e. solid stating). Thus, crystallization is necessary to avoid agglomeration of the pellets during solid stating and during the drying step prior to extruding the melt into bottle performs.

Instead of crystallizing pellets in a stream of hot gas, we have discovered that thermally crystallizing the polyester polymer under a fluid provides numerous advantages. A continuous process for crystallizing either a polyester polymer in the form of molten droplets or spheres or in the form of solid pellets or spheres (collectively "polymer particles") in a hot fluid such as water can be attained if the temperature of the fluid is hot enough to not only crystallize the polymer particles in a short residence time, but to crystallize the polymer particles at a high temperature sufficient to prevent the particles from sticking to each other in a dryer feeding an extrusion device. The temperature required to both crystallize and prevent the particles from sticking in these dryers is well above the boiling point of water at atmospheric pressure, and would typically range from about 130° C. to 180° C. Other fluids which boil at higher temperatures can be used, but these fluids require an extra step of washing the particles to remove any residual fluid remaining on the surface of the particle after separating the fluid from the particle. Other fluids which do not tend to stick to the particle surface can be used, but these fluids tend to have lower boiling points such that their boiling point, like that of water, is also exceeded.

Accordingly, the crystallization process is conducted under pressure to prevent the liquid from fully vaporizing, thereby keeping the particles in the liquid phase where they can be easily transported and crystallized at the temperature of the liquid. The thermal crystallization of the particles in a liquid will generate a liquid/particle mixture. At some point in the process, it is necessary to separate the particles from the fluid. This separation should be achieved without having to substantially reduce the pressure in the under-liquid crystallization zone. Several disadvantages would result by reducing the pressure either in the crystallization line or in the separation zone. One such disadvantage would be increase energy consumption to continuously pressurize the crystallization line to keep the fluid in the liquid phase. Another disadvantage is that a sudden depressurization will flash the liquid into the vapor phase, resulting in fluid loss or equipment to re-condense the vapor. In the case of water which has a high heat of vaporization, a release of pressure will flash or vaporize the water from both the surface and beneath the surface of the particle, thereby quickly cooling the temperature of the particle.

This latter disadvantage may be of no consequence, except that we have made a discovery that it would be highly desirable to maintain the temperature of the particles after separation close to the temperature of the particles before separation. Upon releasing the pressure on the particles during separation, the water on and/or in the particles will quickly vaporize, thereby reducing the particle temperature.

We have discovered that is would be desirable to separate the particles from the liquid while maintaining the system pressure, and to substantially dry the particles without also significantly reducing the particle temperature.

SUMMARY OF THE INVENTION

There is now provided a process comprising providing a pressurized slurry comprising thermoplastic synthetic polymer particles in combination with a liquid at a liquid temperature greater than the normal boiling point of the liquid and under a pressure equal to or greater than the vapor pressure of the liquid at the liquid temperature, feeding the pressurized slurry to a separation zone, and within the separation zone:
 a) separating the liquid from the particles, and
 b) drying the particles;
while under a high pressure equal to or greater than the vapor pressure of the liquid.

There is also provided a process wherein the particles are decoupled from the separation zone comprising depressurizing the particles to a low pressure below the vapor pressure of the liquid while maintaining a high pressure on the particles prior to depressurization at above the vapor pressure of the liquid.

The particles are preferably polyester polymer particles, preferably dried before decoupling to a moisture level of 0.5 wt % or less, the liquid is preferably water, and the pressure is desirably reduced to less than 50 psig and most preferably down to atmospheric after decoupling.

In another preferred embodiment, the temperature of the liquid in the slurry is above 130° C., and the temperature of the particles upon decoupling is above 100° C.

In the process of the invention, by first drying the particles before decoupling, the thermal energy of the particles is substantially retained in the particle since less water remains on or in the particle to vaporize once the particles are de-pressurized upon decoupling the particles from the separation zone.

The are also provided embodiments describing the apparatus used to carry out the solid/liquid separation and drying under pressure with a subsequent decoupling step.

DETAILED DESCRIPTION OF THE INVENTION

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary.

It must also be noted that, as used in the specification and the appended claims, the singular forms "a," "an" and "the" include plural referents unless the context clearly dictates otherwise. For example, reference to at least "a" temperature or "a" pressure includes any temperature and pressure within the range which may be maintained at a constant value or may change over time, so long as at least in part of the time, a value is within the stated range. References to a composition containing "an" ingredient or "a" polymer is intended to include other ingredients or other polymers, respectively, in addition to the one named.

Ranges may be expressed herein as from "about" or "approximately" one particular value and/or to "about" or "approximately" another particular value. When such a range is expressed, another embodiment includes from the one particular value and/or to the other particular value expressed. Also, a range included all values and fractions thereof within the range.

By "comprising" or "containing" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

It is also to be understood that the mention of one or more method steps does not preclude the presence of additional method steps before or after the combined recited steps or intervening method steps between those steps expressly identified.

It is also to be understood that the identification of a test method, or an equation which a process or composition satisfies, whether or not expressed in the claims, does not have to be practiced in a commercial embodiment in order for the invention as claimed to be practiced. Test methods and equations are convenient measurement techniques applied if necessary to answer a question of whether the invention as practiced is within the scope of a claim.

The intrinsic viscosity values described throughout this description are set forth in dL/g units as calculated from the inherent viscosity measured at 25° C. in 60/40 wt/wt phenol/tetrachloroethane according to the calculations expressed below.

There is now provided a process comprising providing a pressurized slurry comprising thermoplastic synthetic polymer particles in combination with a liquid at a liquid temperature greater than the normal boiling point of the liquid and under a pressure equal to or greater than the vapor pressure of the liquid at the liquid temperature, feeding the pressurized slurry to a separation zone, and while maintaining the pressure on the liquid at a level equal to or greater than the vapor pressure of the liquid at the liquid temperature:

a) separating the liquid from the particles, and
b) drying the particles;

In a further embodiment, the particles are subjected to a decoupling step in which the pressure on the dried particles is reduced to a level below the vapor pressure of the liquid applied to the slurry.

The pressurized slurry comprises a combination of thermoplastic synthetic polymer particles and a liquid under a pressure greater than the vapor pressure of the liquid at the liquid temperature. In this manner, the liquid is prevented from boiling.

The shape of the particles is not limited, and can include particles, spheres, pellets, discontinuous or chopped fibers, cylindrical, irregular, pastilles, stars, flake, or any other shape. In a preferred embodiment, the particles are substantially spherical, as would be obtained from cutting molten polymer under-liquid where the particles have an average aspect ratio of 1.5 or less. The size of the particle is also not limited, so long as the process is capable of performing the desired separation, drying, and depressurization functions. Suitable average particle sizes range from 0.1 mm to 25 mm, preferably from 1 to 4 mm, in largest dimension.

The state of the polymer in the slurry can be as a melt, semi-solid, or solid, provided that the polymer takes the shape of particles in the liquid. Thus, a slurry in the process of the invention is not restricted to a solid/liquid mixture, but also includes molten particle/liquid mixtures and semi-solid/liquid mixtures. Prior to separating the particles from the liquid, however, the temperature of the liquid is preferably beneath the low peak melting point of the polymer if one exists, and if one does not exist, then below the high peak melting point of the polymer, as determined by DSC at 20° C./min. More preferably, the liquid temperature at any point while the particles are undergoing crystallization, and more preferably the temperature of the liquid fed to the separation zone, and/or the temperature of the liquid separated from the particles at the liquid outlet of the solid/liquid separator, is above 100° C., or at least 120° C., or at least 130° C., or at least 140° C., and up to 190° C., or up to 180° C.

The method for making the slurry of particles in the liquid is not limited. One such method is to force a molten stream of polymer through a die, continuously cut the molten polymer stream at the die as it is forced through the die under a stream of liquid, and allow the cut polymer to entrain the stream of liquid thereby producing a slurry of polymer particles and liquid. Alternatively, one may merely obtain a supply of virgin or PCR polymer particles and mix them with a liquid, either at atmospheric followed by pressurizing the slurry, or by entraining the supply of particles into a pressurized stream of liquid. In yet another method, molten thermoplastic synthetic polymer may be forced through a die into a liquid bath under pressure to form strands, which strands are sent through an in-line chopper or pelletizer, thereby forming a slurry of particles and liquid.

The thermoplastic synthetic polymer is any polymer obtained by polymerizing monomers, and which is thermoplastic such that the polymer can be converted into particles and then a useful article, such as a fiber, a molded article, or a sheet which can be thermoformed. The polymers preferably do not include liquid crystal polymers which obtain an ordered structure upon melting. Preferred thermoplastic polymers are condensation polymers polymerized by condensing monomers, or by a combination of condensation and addition reactions, as well as graft polymers in which the backbone of the polymer is a condensation polymer.

Examples of condensation polymers include polyesters, polyamide, polycarbonate, and copolymers and graft polymers thereof. The polymers desirably have a number average molecular weights ranging from 1000 to 500,000, and typically from 2000 to 50,000.

The polyester polymer contains repeating units of ester linkages. The polyester polymer may be aliphatic or partially aromatic. Preferred polyester polymers contain alkylene terephthalate repeating units or alkylene naphthalate repeating units in an amount of at least 60 mole % based on the total moles of units in the polymer. The polyester polymer may optionally be isolated as such.

More preferred are polyester polymers comprising:
(a) a carboxylic acid component comprising at least 80 mole %, or at least 85 mole %, or at least 90 mole %, or at least 96 mole %, of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 60 mole %, or at least 90 mole %, or at least 96 mole %, of the residues of ethylene glycol or propane diol, more preferably ethylene glycol, based on 100 mole percent of carboxylic acid component residues and 100 mole percent of hydroxyl component residues in the polyester polymer.

All the compounds containing carboxylic acid group(s) or derivative(s) thereof that are in the product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the product refers to the portion of said compound(s) which remains in the oligomer and/or polymer chain after the condensation reaction with a compound(s) containing hydroxyl group(s).

More than one compound containing hydroxyl group(s) or derivatives thereof can become part of the polyester polymer product(s). All the compounds containing hydroxyl group(s) or derivatives thereof that become part of said product(s) comprise the hydroxyl component. The mole % of all the compounds containing hydroxyl group(s) or derivatives thereof that become part of said product(s) add up to 100. The residues of hydroxyl functional compound(s) or derivatives thereof that become part of said product refers to the portion of said compound(s) which remains in said product after said compound(s) is condensed with a compound(s) containing carboxylic acid group(s) or derivative(s) thereof and further polycondensed with polyester polymer chains of varying length.

The mole % of the hydroxyl residues and carboxylic acid residues in the product(s) can be determined by proton NMR.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may preferably contain such comonomers as such as Isophthalic acid, naphthalane dicarboxylic acid, cyclohexanedimethanol, and diethylene glycol.

The polyester pellet compositions may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

Other methods for the manufacture of condensation polymer and thermoplastic addition polymers are conventional and described in Kirk Othmer Encyclopedia of Chemical Technology by John Wiley & Sons.

A suitable It.V. of the thermoplastic synthetic polymer from the melt phase can range from 0.55 dl/g to 1.15 dl/g. However, one advantage of the process is that the solid stating step can be avoided. Solid stating is commonly used for increasing the molecular weight (and the It.V) of the pellets in the solid state, usually by at least 0.05 It.V. units, and more typically from 0.1 to 0.5 It.V. units. Therefore, in order to avoid a solid stating step, a polymer obtains an It.V. in the melt phase preferably of at least 0.7 dL/g, or at least 0.75 dL/g, and up to about 1.2 dL/g, or 1.15 dL/g. The It.V. of the polymer made in the melt phase can be conveniently measured by sampling particles obtained from a pelletizer associated with the melt phase polymer.

Once the thermoplastic synthetic polymer is manufactured in the melt phase polymerization, it is solidified. The method for solidifying the thermoplastic synthetic polymer from the melt phase process is not limited. For example, molten thermoplastic synthetic polymer from the melt phase may be directed through a die, or merely cut, or both directed through a die followed by cutting the molten polymer. A gear pump may be used as the motive force to drive the molten thermoplastic synthetic polymer through the die. Instead of using a gear pump, the molten thermoplastic synthetic polymer may be fed into a single or twin screw extruder and extruded through a die, optionally at a temperature of 190° C. or more at the extruder nozzle. Once through the die, the thermoplastic synthetic polymer can be drawn into strands, contacted with a cool fluid, and cut into pellets, or the polymer can be pelletized at the die head, optionally under-liquid. The thermoplastic synthetic polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers. Examples of underwater pelletizers are set forth in U.S. Pat. Nos. 5,059,103, 6,592,350; 6,332,765; 5,611,983; 6,551,087; 5,059,103, 4,728,276; 4,728,275; 4,500,271; 4,300,877; 4,251,198; 4,123,207; 3,753,637; and 3,749,539, each of which are fully incorporated herein by reference.

The source of the polymer used in the slurry is not limited. Described above is a method for obtaining the polymer from a melt phase process for making virgin polymer. Alternatively, the molten polymer may obtained from scrap trimmings, or from post consumer recycled ("PCR") polymer. The history of the polymer is not limited and the polymer can undergo any history and any state prior to converting the polymer into a particle or adding the polymer as a particle to the liquid to make the slurry.

The method for introducing the molten condensation into the liquid is not limited. For example, in one embodiment, the molten polymer, obtained from any source and whether virgin or PCR, is directed through a die, or merely cut, or both directed through a die followed by cutting the molten polymer. In another example, the thermoplastic synthetic polymer may melt extruded with a single or twin screw extruder through a die, optionally at a temperature of 190° C. or more at the extruder nozzle, and cut into particles or extruded into strands or any other die shape. In yet another alternative embodiment, the molten thermoplastic synthetic polymer is pumped directly or indirectly from a melt phase finisher vessel with a gear pump, forced through a die and cut into particles or shaped into a strand, sheet or other die shape.

The particular liquid used is not limited. A liquid composition which causes an undesirable high loss in the It.V. under all operating conditions should be avoided. Examples of liquids which are suitable for use in the process include water; polyalkylene glycols such as diethylene glycol and triethylene glycol; and alcohols.

In one embodiment, the particles are contacted with the liquid at high temperature in order to partially crystallize the polymer. In this case, it is desired to use liquids that have a high heat capacity to optimize heat transfer to the pellets at the lowest possible residence time. Liquids which have low vapor pressures are also desirable to further reduce equipment costs since a vessel with a lower pressure rating can be used. However, a significant and sometimes overriding factor to consider in the selection of the liquid is the ease with which the liquid is separated from the particles, the ease with which the liquid is volatized from the particle, and the costs associated with handling, heating and recirculating the separated liquid back to contact a fresh feed of particles to be entrained into the liquid. The heat capacity of water, 1 cal/g/° C., is attractive and the ease with which water is separated from the pellets and volatized from the pellets is excellent. If desired, a mixture of water with other substances (e.g. liquids or salts) which depress the vapor pressure of the liquid can be used. For example, water can be mixed with other glycols in an amount not exceeding the solubility of the glycols in water under the operating conditions in the liquid zone. It is preferred to use liquids which are water soluble so that excess liquid can be removed from the pellets by water washing.

The slurry of particles and liquid is under a pressure at a level which equals or exceeds the vapor pressure of the liquid. The pressure on the liquid exceeds the vapor pressure of the liquid in order to ensure that the fluid remains in the liquid state. Accordingly, the pipe or vessel containing the slurry may have a positive pressure on the slurry which exceeds one (1) atmosphere. This is the case where, for example, an aqueous medium is used at the temperature of the liquid is at or exceeds 100° C. The particular pressure on the slurry chosen will depend on the liquid composition and the desired temperature applied by the liquid to the particles. However, in one embodiment, at a minimum, the liquid has a boiling point at 1 atmosphere which is less than the temperature of the liquid contacting the particles. And conversely, the temperature of the liquid contacting the particles is higher than the boiling point of the liquid at 1 atmosphere.

The pressure may be induced by way of introducing a pressurized inert gas such as nitrogen, or air, any other suitable gas, or by pumping a greater amount of liquid into the liquid zone. Or, a combination of the aforementioned pressure inducing means may be used.

The vapor pressure of a liquid is normally determined experimentally from the pressure exerted by its vapor when the liquid and vapor are in dynamic equilibrium. However, it is possible in actual practice that the liquid and vapor in the liquid zone may not be in equilibrium at any single point in time or location within the fluid because of variations in pressure from perturbations in the system well known to those skilled in the art, such as pressure differentials across piping, valves, weirs, etc. and non-uniform heating. As a result, it is possible that less static pressure on the liquid is needed to keep the liquid from boiling compared to the static pressure needed to keep that same liquid from boiling in a closed system in dynamic equilibrium. Accordingly, the pressure a liquid zone is also deemed to be at or above the vapor pressure of the liquid if the liquid does not boil, even though the actual static pressure in the liquid zone may be slightly less than the theoretical pressure needed to exceed the dynamic vapor pressure of the liquid.

The pressure in a liquid zone containing the slurry of particles is set above the vapor pressure of the liquid at the liquid temperature, which along with the flow rate is a function of the desired residence time. Using water as an example, its boiling point at 52 psia is 140° C., and at 69 psia is 150° C., 115 psia at 170° C., 145 psia at 180° C. Accordingly, the pressure can be set high to increase the boiling point of water and decrease the residence time of the particles in the hot liquid. Pressures exceeding 25, exceeding 50, or exceeding 75, or exceeding 100, or exceeding 150, or exceeding 200 psia, and up to about 300 psia are contemplated as suitable for most applications.

The liquid can be static so as to allow a molten shaped polymer to be pulled through the liquid (as in the case of strands) or to allow particles to fall through the liquid for the desired residence time to induce the desired degree of crystallization. Alternatively, the liquid may have a flow to carry the particles to a desired destination, or if not to carry the particles, at least to impart sufficient flow or turbulence to keep the particles from sticking to each other.

Preferably, the liquid has a flow, and the flow rate and type of flow is set to submerge the particles. The particular flow rate will depend on the liquid medium zone volume and the particle feed rate. A particle is considered submerged in the liquid when the liquid envelops the entire particle. However, the particles are considered submerged if the bulk of the particles are enveloped in the fluid at any point during crystallization of the particles, even though some if not all particles at any one point in time are temporarily on or above the surface of the liquid, which may occur in a turbulent environment. Preferably, the particles are submerged over substantially the entire time the particles are crystallized.

The residence time of the particles to obtain the desired degree of crystallization is desirably short to limit the cycle time, reduce the equipment cost, and to minimize It.V. loss if this is a concern. The residence time is the time lapse which the thermoplastic synthetic polymer experiences commencing from the introduction of the particle into the hot liquid (above the $T_g$ of the polymer) to either the time when the temperature of the thermoplastic synthetic polymer drops and stays below the $T_g$ of the thermoplastic synthetic polymer prior to separation from the liquid, or when the thermoplastic synthetic polymer is removed from the liquid, whichever is shorter. In a preferred embodiment, the residence time, along with other operating conditions, is not so long as to substantially increase or decrease the It.V. which can be correlated to the weight average molecular weight, of the thermoplastic synthetic polymer. Although the process of the invention allows one to keep the particles in contact with the hot liquid for a time sufficient to increase the It.V. of the pellets, it is more preferred to reduce the residence time to that necessary to impart the desired degree of crystallization to the polymer, and as noted below, by crystallizing a polymer having a high It.V. from the melt, a solid stating step can be altogether avoided.

The residence time of the particles in the liquid is not limited. However, an advantage of the process allows one to shorten the residence time to 15 minutes or less to impart to the particle a degree of crystallinity of 20% or more, or 25% or more, 30% or more, and even up to 40% or more as measured in the resulting particle taken immediately after its separation from the liquid. For most applications, a degree of crystallinity ranging from 25% to 45% is suitable. The residence time can even be as low as more than 0 seconds to 10 minutes depending upon the crystallization temperature. At temperatures ranging from 140° C. to 180° C., the crystallization time to obtain a degree of crystallinity of 25% or more and even 30% or more ranges from greater than 5 seconds to about 8 minutes or less.

In a more preferred embodiment, crystallization is conducted in the absence of rotating mechanically induced agitation in the liquid zone. Horizontal liquid filled, rotating paddle agitated vessels are known to provide the necessary motion to prevent pellets from agglomerating during crystallization. In this embodiment, however, capital and operating costs are reduced by avoiding rotating mechanically induced agitation during crystallization while also avoiding agglomeration. This may be accomplished in several ways. Particles fed into a non-horizontally oriented liquid zone filled or nearly filled with a liquid are allowed to settle through the fluid toward the bottom of the vessel while providing the particles and optionally resulting pellets with the buoyancy and necessary residence time through an upflow of liquid and/or by controlling the density difference between the pellets and the liquid. Alternatively, the particles may be fed through a pipe acting as a liquid zone under a flow of fluid to keep the particles moving through the pipe. Desirably, the flow rate and type of flow of liquid through the pipe prevents or contributes toward the prevention of particle agglomeration or sticking to the pipe walls.

In one embodiment, the use of costly pressure rated crystallization tanks may be avoided by crystallizing particles in a pipe. The particles may be crystallized in a pipe by directing a flow of particles in a liquid through a pipe having an aspect ratio L/D of at least 15:1, wherein the particles are crystallized in said pipe at a liquid temperature greater than the $T_g$ of the thermoplastic synthetic polymer. A pipe may be distinguished from conventional vessels in that a pipe has an aspect ratio of length to diameter of greater than 15:1, preferably greater than 25:1, more preferably greater than 50:1. The length of the pipe having an aspect ratio of at least 15:1 is inclusive of a series of pipes joined by couplings, elbows, u-turn, bends, etc.

In a pipe design, the liquid temperature is suitably about 90° C. or more, preferably 100° C. or more, more preferably 130° C. or more, and most preferably 140° C. or more. It is also desirable to pressurize the pipe at or above the vapor pressure of the liquid.

The pipe may be designed to provide partial or incomplete crystallization, or to finish off crystallization. The degree of crystallization imparted to the particles in the pipe is preferably at least a 20%, more preferably to at least 30%, and most preferably at least 40%. The particles can be crystallized to 25% or more at a residence time of 15 minutes or less, or 10 minutes or less, and even 7 minutes or less. In one embodiment, the particles are crystallized in the pipe to a degree of crystallization of 30% or more within 10 minutes or less, or 5 minutes or less, or 3 minutes or less, or a degree of crystallization of 40% or more within 10 minutes or less, or 5 minutes or less, or about 3 minutes or less.

The pipe is preferably devoid of internal devices such as mechanically rotating paddles, and more preferably is devoid of in-line mixers, weirs, or baffles, and the flow of the liquid is desirably in the same direction as the flow of the pellets. The pipe may be filled with a slurry of liquid and particles. Alternatively, the pipe may be filled with a vapor, the liquid and the particles. The pipe may be oriented horizontally, sloped down to allow gravity to assist the flow of particles, oriented upward against gravitational forces and in an upflow of high pressure fluid to induce a high degree of turbulence, or a combination of these features. The flow through the pipe will comprise molten and/or crystalline polymer, liquid, and optionally vapor or gas flow.

Significant sticking of the particles to each other in the pipe or to the pipe may be avoided even in the absence of rotating mechanically induced agitation by creating a continuous flow of pellets through the pipe. The liquid velocity should be adjusted to reduce pellet agglomeration in the pipe. While sporadic or minor agglomeration may occur in the pipe, the frequency or number of particles agglomerating does not interfere with the dewatering equipment, and the particles or pellets ejected from such equipment are discrete.

A liquid flow velocity of 1 ft/s or more is suitable to provide a continuous flow of particles in the pipe while reducing the tendency of the particles to roll along the pipe walls in mass and stick to each other. At a residence time ranging from 30 seconds to 20 minutes, the pipe length and diameter may range from 30 ft to 9600 ft at a diameter ranging from 1 inch to 14 inches with a liquid velocity ranging from 1 ft/s to 8 ft/s. Other pipe lengths and diameters are suitable as well, and the optimal pipe design will depend upon balancing such factors as the cost of pipe based on its length, diameter, material of construction and pressure rating, the energy required to pump the liquid, the thermal energy applied to crystallize at a desired temperature, the polymer IV loss, and the desired residence time.

Once the particles have been crystallized to the desired degree, the particles or the resulting pellets are separated from the liquid. The particles may be separated as such from the liquid because at temperatures ranging from 100° C. to 180° C., the particles, once crystallized, have sufficient strength and rigidity and are under sufficient pressure on discharge to avoid unduly clogging the separation equipment or sticking to each other during or after separation. Alternatively, prior to separation, the particles may be allowed to cool to a temperature below their sticking point, or to a temperature below the $T_g$ of the polymer to form pellets in order ease the task of separating the liquid from the polymer. Allowing the polymer to cool to form pellets prior to separation reduces the risk of the polymer sticking to the separation equipment or to other polymer particles.

The above described methods for forming particles and for crystallizing are only a few non-limiting examples of the methods available to form a slurry of particles in a liquid under a pressure equal to or greater than the vapor pressure of the liquid. Whatever process is chosen, at the stage for separating the particles from the liquid and for drying the particles (for convenience referred to as the "separation zone"), the particles are under a vapor pressure equal to or greater than the vapor pressure of the liquid. Thus, the process of the invention provides for a pressurized slurry comprising thermoplastic synthetic polymer particles in combination with a liquid at a liquid temperature greater than the normal boiling point of the liquid and at a pressure equal to or greater than the vapor pressure of the liquid at the liquid temperature, feeding the pressurized slurry to a separation zone, and within the separation zone:

a. separating the liquid from the particles, and
b. drying the particles;
while under a high pressure equal to or greater than the vapor pressure of the liquid.

In the process of the invention, the particles under a vapor pressure equal to or greater than the vapor pressure of the liquid are separated from the liquid and dried before the pressure on the particles is reduced below the level of the vapor pressure of the separated liquid. A drying process is the reduction of residual moisture on or in the particles. Merely reducing the liquid level in a slurry of particles is not drying step. In the process of the invention, the particles are being dried when the particles are not submerged in a liquid and do not reside in a bath or pool of liquid or in a continuous phase of liquid between particles, and the moisture content on or in the particles is reduced.

In a preferred embodiment, the particles are dried while under the high pressure to a degree such that the moisture content of the particles prior to decoupling is 5 wt. % or less, or 3 wt. % or less, or 2 wt. % or less, or 1 wt. % or less, or 0.65 wt. % or less, or 0.5 wt. % or less, or 0.4 wt. % or less. The moisture content of a particles prior to decoupling is not directly measured since the particles are under pressure. However, the moisture content can be correlated to the temperature differential before and after decoupling. The moisture content of the particles is calculated by the following test method: The temperature of the particles in front of or upstream from the decoupling zone, or in front of or upstream from the valves used to decouple the particles from the separation device, and the temperature immediately behind the decoupling zone, are both measured. The temperature drop on the particles upon decoupling is a direct indicator of the maximum level of moisture on or in the particles. The temperature of the particles before and after decoupling can be determined by any conventional means, including inserting a temperature probe into the gas/particle mixture. The temperature drop is correlated to the moisture level of the particle before decoupling by the following equation:

$$f_{max} = C_p \Delta T / \Delta H_{vap}$$

where:
$f_{max}$=maximum possible fraction of liquid in the particles before decoupling
$C_p$=heat capacity of the polymer at temperature before decoupling
$\Delta H_{vap}$=heat of vaporization of the liquid at the temperature before decoupling
$\Delta T$=temperature drop: temperature of the particles after decoupling subtracted from the temperature of the particles before decoupling.

The moisture content of the particles after decoupling is not an indicator of the moisture content of the particles before decoupling because upon decoupling, the moisture flashes from the particles, leading to evaporative cooling. Thus, in this preferred embodiment, the object is not only to produce particles at atmospheric pressure which are dry (e.g. to a level of less than 1%), but also to ensure that the moisture level of the particles before decoupling is sufficiently low to minimize evaporative cooling of the particles upon decoupling to produce a particle stream which is both hot and dry.

A pressure equal to or greater than the vapor pressure of the liquid is maintained within the separation zone. Allowing the pressure to fall below the vapor pressure of the liquid during separation requires a corresponding amount of energy to repressure the slurry entering the separation zone. Maintaining the pressure on the particles during separation but not during the drying operation will cause the residual moisture on or in the particles to either flash or evaporate. Allowing the residual liquid to evaporate or flash from the particles results in fluid losses or requires equipment to re-condense the flashed vapor. Thus, both the separation and drying of the pellets are conducted under pressure.

The method for separating the particles from the liquid is not limited. Suitable methods include the application of centrifugal forces such as by a centrifugal dryer; feeding the slurry into a screened cage or passing the slurry over or through a porous barrier to allow the liquid but not the particles to flow through the barrier; or by the application of impact forces to disengage the liquid from the surface of the polymer.

The method for drying the particles is also not limited. Suitable methods include applying centrifugal forces to the particles, applying impact forces to disengage the liquid from the surface of the polymer, applying a flow of gas or dried gas over the surface of the particles, or by squeezing the moisture from the particles.

The separation zone includes the operation of both separating and drying the particles. The separation of liquid from particles and drying the particles may occur in discrete steps, virtually simultaneously, or over a continuum where the separation gradually proceeds to a drying operation. Any vessel which can both separate liquid from the particles, and dry the particles under high pressure and high temperature is suitable. Alternatively, a series of vessels which individually perform each function may be in fluid communication with each other. If desired, a series of vessels which collectively perform one function (e.g. separation) in fluid communication with each other may be connected to a second sole vessel or series of vessels which collectively perform another function (drying). The configuration and design to separate and dry the particles is not limited so long as the separation and drying are conducted under a pressure greater than the vapor pressure of the liquid used in the slurry.

A centrifugal dryer is one non-limiting example of a vessel capable of both separating particles from a liquid and drying the resulting particles. Examples of centrifugal dryers can be found U.S. Pat. No. 3,458,045; DE 1953741A1; DE4330078A1; U.S. Pat. No. 4,218,323; U.S. Pat. No. 5,611,150; DE2819443A1; U.S. Pat. No. 4,565,015; and U.S. Pat. No. 5,265,347; each of which are wholly incorporated herein by reference. In a typical centrifugal dryer, a rotor turns within the space of a stationary cylindrical screen. However, other designs are also suitable and preferred if one desires to further decrease the residual moisture level on the particles. Examples of such other vessels include centrifuges such as a solid or screen bowl decanter centrifuge in which both the rotor and basket spin, vertical axis basket centrifuges in which the basket spins, and a pusher centrifuge; or draining the liquid followed by drying with an air knife (a gas flow method); or draining followed by belt pressing (a squeezing method). Preferred are centrifugal dryers and centrifuges.

In a preferred embodiment of the invention, a pressurized slurry, comprising thermoplastic synthetic particles and a liquid, is fed to a centrifugal dryer in which the liquid is separated from the particles and the particles are dried while under a high pressure equal to or greater than the vapor pressure of the liquid, wherein centrifugal forces and/or impact forces, preferably at least centrifugal forces are applied to the particles during separation and during drying. The centrifugal forces and/or impact forces can be applied during a part of the separation and drying operation, or during the entire time the liquid is being separated from the particles and the particles are being dried within the centrifugal dryer. If desired, additional mechanisms explained further below can be used to enhance drying.

In another embodiment of the invention, the temperature of the particles separated and dried in the separation zone is close to the temperature of the liquid in the slurry entering the separation zone. In this optional embodiment, we have found it advantageous to produce a discharged stream of dried hot particles to lower the energy requirements for reheating the particles in subsequent processing operations. By contrast, if the particle temperature is allowed to drop significantly during drying, more energy is required to reheat the particles in subsequent operations. Thus, an integrated system can be provided with lowered energy consumption rates if the thermal energy in the particles is not allowed to escape to the atmosphere. To minimize the temperature drop of the particles, the pressure on the particles during drying is maintained above the vapor pressure of the liquid on or in the particles. Since many liquids have high heat of vaporization and absorb much of the thermal energy in the particle, maintaining the pressure on the particles to keep the moisture on or in the particles in the liquid state prevents the liquid from evaporating and removing the thermal energy stored on or in the particles. This embodiment provides another reason for maintaining the pressure on the particles above the vapor pressure of the liquid during separation and drying.

Some amount of heat loss is expected in the separation zone, particularly if a flow of air is directed over the particles. However, such temperature drops would be more drastic if a pressure drop across the particles were allowed during separation and drying. In this embodiment, the temperature of the particles upon decoupling (immediately after the pressure is reduced below the vapor pressure of the liquid) is within 80° C., or within 60° C., or within 40° C., or within 20° C., or within 10° C. of the temperature of the liquid entering the separation zone, preferably without the application of heat energy from a source other than the liquid between the time the slurry enters the separation zone and decoupling. In more preferred embodiments, the temperature of the liquid in the slurry fed to the separation zone is at least 120° C., and the temperature of the decoupled particles upon decoupling is at least 70° C., or at least 90° C., or greater than 100° C., or at least 110° C., as measured upon decoupling. In yet another embodiment, the temperature of the liquid in the slurry fed to the separation zone is at least 140° C., and the temperature of the decoupled particles upon decoupling is at least 80° C., or greater than 100° C., at least 120° C. In each of these embodiments, the temperature of the particles upon decoupling, regardless of the temperature drop, is above the normal boiling point of the liquid.

Once dried to the desired degree of moisture, the particles are preferably decoupled from the separation zone by depressurizing the particles to a low pressure below the vapor pressure of the liquid at the liquid temperature while maintaining a high pressure on the particles prior to depressurization at above the vapor pressure of the liquid at the liquid temperature. The pressure inside the separation zone should not drop and stay below the vapor pressure of the liquid at the liquid temperature. Pressure fluctuations within the dryer (or separation zone) are acceptable provided that the pressure does not continuously drop or remain below the vapor pressure of the liquid at the liquid temperature during separation or drying. More preferably, the pressure drops within the separation zone do not fall below the vapor pressure of the liquid at the liquid temperature. As explained further below, however, it is preferred to provide a pressure regulator and controller to inject compressed gas into the system at a convenient location to maintain a pressure above the vapor pressure of the liquid and to more preferably maintain a constant +/−20 psig pressure within the separation zone or within the dryer.

Thus, there is provided another embodiment in which thermoplastic polymer particles, preferably polyester polymer particles, containing a level of liquid moisture and at a pressure greater than atmospheric pressure at a temperature of at least 130° C. are decoupled comprising depressurizing the particles to a low pressure of less than 50 psig, wherein the particle temperature upon decoupling is greater than 100° C., preferably at least 110° C.

Particles discharged from the separation zone are decoupled from the separation zone by conventional equipment known to maintain a high pressure on one side of a zone and reduced pressure on the other side of a zone. For example, the dried particles may be discharged from the separation zone into a chute, holding tank, vertical pipe, or any suitable container allowing the particles to accumulate to a height, following which at measured intervals, a series of valves, such as gates or ball valves, are actuated with a first gate or ball opening to receive the dried particles into an air lock chamber while a second gate downline remains closed. Once the air lock chamber is filled to a desired level, the first gate or ball closes and the second gate or ball opens, thereby decoupling the particles from the separation zone while maintaining the pressure in the separation zone above the vapor pressure of the particles. Other suitable valves include conventional in-line rotary valves which operate much like a revolving door to receive particles into a quadrant which spins and seals against a housing and continues to spin toward the low pressure side of a pipe releasing the particles. The rotary valve is segmented into several chambers and spins continuously to rapidly sequentially receive, seal, and discharge particles continuously at the rate corresponding to the rotor revolutions.

At least a portion of the liquid separated from the separation zone is preferably re-circulated directly or indirectly as a feed for the manufacture of the slurry where the particles are entrained into the liquid. The re-circulated liquid may be fed first through filters to remove fines and particles, and may be re-heated or cooled.

It is expected that some pressure loss and pressure leaks will be experienced around seals or in the separation zone due to the decoupling mechanisms, which do not perfectly maintain the same pressure on either side of the mechanism. Accordingly, the pressure within the separation zone can be maintained relatively constant by re-pressurizing the liquid at any point, such as in the re-circulation line, in the crystallization zone, at the means used for entraining the particles in the liquid, or in the separation zone. Providing a pump on the liquid recirculation line is a convenient method for re-pressurizing the liquid. Alternatively, the flow of air in the separation zone can also be a flow of pressurizing air, thereby providing the means for re-pressurizing the liquid. In the process of the invention, however, much less energy is required to maintain the pressure of the liquid in the separation zone above the vapor pressure of the liquid than in methods which allow the pressurized slurry to be vented to the atmosphere prior to separating the liquid from the particles.

The temperature of the separated liquid may optionally be slightly re-heated, not heated at all, or even cooled. For example, if the particles are entrained into the slurry by forcing a melt through a die and cutting the melt into particles underfluid, the temperature of the melt may very well exceed the desired crystallization temperature. In this case, the temperature of the incoming liquid fed to the underfluid cutter must be lower than the temperature of the melt to ensure that the molten particles cut underfluid sufficiently cool to the desired crystallization temperature. Thus, the heat losses throughout the system which lower the temperature of the re-circulated fluid fed to the underfluid cutter may be adequate and the correct desired temperature to cool the melt to crystallization temperatures. Alternatively, the temperature of the re-circulated fluid may yet be too hot, despite the heat losses throughout the system, requiring the fluid to be cooled to allow for the heat transfer of the molten polymer cut underfluid to be transferred to the liquid. In the event that the re-circulated liquid is cooled, a heat exchanger may be provided which transfers some of the heat from the re-circulated fluid to provide thermal energy for other processes in a plant setting.

Figure 1:
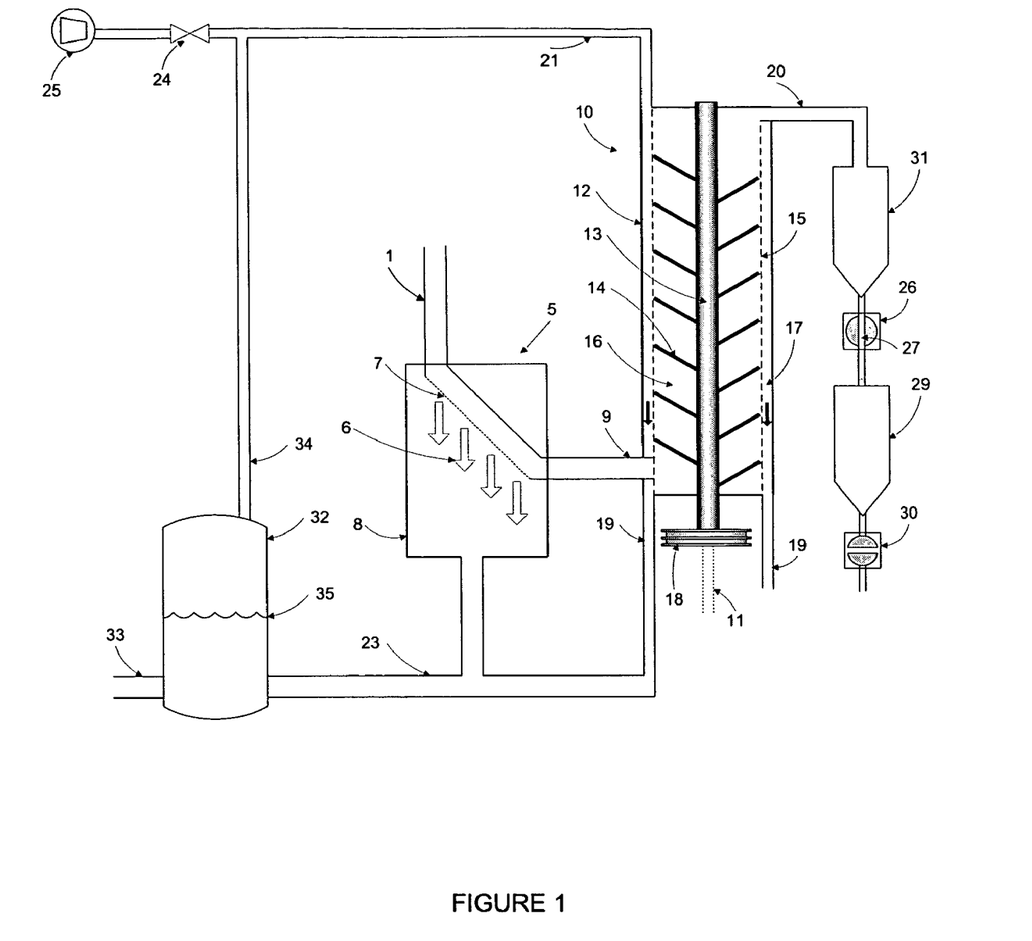
FIG. 1 is a process flow diagram for separating liquid and polymeric particles from each other and drying the particles while under a vapor pressure equal to or greater than the vapor pressure of the liquid at the liquid temperature.

A centrifugal dryer is illustrated in FIG. 1. Slurry under a pressure greater than the vapor pressure of the liquid is fed through pipe 1 to a centrifugal drying vessel 10. The slurry in line 1 may optionally be shunted to a line an agglomerate catcher which removes large agglomerates or globs of polycondensation particles or other large particulate matter. During start-up when the system parameters have not yet reached a steady state of operation, it is possible that some of the thermoplastic synthetic polymers may agglomerate. The agglomerate catcher may simply consist of a large pored screen allowing all but the larger sized agglomerates to pass through. The slurry continues is path back to line 1 and flows to the centrifugal dryer 10.

If the slurry flow is large, it is preferred to separate the liquid from the particles in two stages, a first dewatering stage wherein a bulk of the liquid is separated from the particles without the use of centrifugal forces and a second stage wherein at least centrifugal forces are applied to separate the remainder of the liquid from the particles. As illustrated in FIG. 1, there is provided an optional first stage wherein the bulk of the water is separated from the particles in dewatering zone 5 through gravitational forces. The dewatering zone 5 is part of and within the separation zone since the pressure on the particles in the dewatering zone is maintained above the vapor pressure of the liquid. The slurry in the pipe flows into the dewatering zone where the bulk of the liquid 6 flows by gravity through a screen 7 into a vessel 8 sealed to the pipe 1, thereby allowing the remainder of the particles to flow along with residual water into the centrifugal dryer 10. Alternatively, the optional dewatering zone can be completely dispensed with whether or not the flow of the slurry is large, and the entire slurry flow can be directed into the centrifugal dryer without first separating a portion of the liquid from the particles.

The slurry flowing through pipe 1 is fed to the dryer through a slurry inlet 9 conveniently located anywhere in fluid communication with the dryer housing 12 oriented vertically, but if desired, can be oriented horizontally. In this illustration, the slurry inlet 9 is located close to the bottom and as a side-entry to the dryer housing 12. Alternatively, the slurry can be fed through the bottom of the housing through slurry inlet 11, and flow up through the core of longitudinally oriented porous rotor shaft 13 such that the slurry is distributed tangential to the rotor shaft and along the length of the hollow rotor shaft. Any conventional technique for feeding the slurry to the dryer is acceptable.

The slurry enters the dryer housing equipped with a longitudinally oriented rotor 13, lifters 14 attached to the rotor 13, and a cylindrical screen 15 forming an inner annulus 16 defined as a space between the rotor shaft 13 and the screen 15, and an outer annulus 17 defined as the space outside of the screen 15. The rotor 13 and the lifters attached to the rotor are rotated at high speed by a pulley or sheave 18. More than one screen may be provided.

The slurry enters the inner annulus 16 by any conventional means. The liquid is separated from the particles by the centrifugal forces exerted on the slurry through the high speed rotation of the rotor 13 and the action of the lifters 14 flinging the slurry against the cylindrical screen 15 having pores sized to contain the pellets while allowing the liquid to pass through. The rotor may spin at revolutions ranging from 200 rpm to 4000 rpm. Liquid thrown from the particles is forced through the screen and into the outer annulus, as shown by arrows, drains to the bottom of the housing 12, and is discharged through any one or more of outlets 19. Optionally, the liquid separated from the particles in the housing, and the liquid separated from the particles in an optional dewatering zone 5, are combined, 23, and fed to a water tank, 32. If present, it is preferably to control the level of the water in the tank, 35, by means well known in the art. A pressure equalization line, 34, is provided between the water tank 32 and the gas inlet to the housing 21. The liquid separated from the particles in the housing, and the liquid separated from the particles in an optional dewatering zone 5, are combined and optionally re-circulated as a source of liquid in the slurry fed to the dryer 10. If water tank 32 is present, outlet line 33 is optionally recirculated.

The particles within the inner annulus rise to the top in a flow pattern dictated by the lifter 14 design. The lifters are vanes or blades configured to elevate the particles upward generally in a helical pattern as the rotor 13 spins. Usually, the particles are flung back and forth between the screen and lifters by centrifugal forces and have an upward force applied by the configuration of the lifter blades. As the particles rise through the inner annulus, they are discharged from the dryer housing 12 through the particle outlet 20.

The lifters 14 are optionally shaped inward toward the rotor and their orientation and placement designed to reduce the tendency of the particles to strike the screen 15 so that the tendency is for the particles to strike each other, the rotor, and the next succeeding lifter blades. Alternatively, or in addition, deflector strips may be arranged on the cylindrical screen facing the inner annulus to bounce the particles off of the screen surface and back onto the lifter blades.

A supply of pressurized air or other gas to maintain pressure is desirably fed into the housing through a gas inlet 21. Any gas inlet location is suitable. The introduction of the gas keeps the housing pressurized to a desired and preferably constant level above the vapor pressure of the liquid. The pressure within the vessel can be monitored by a probe within the vessel leading to a controller 24 for actuating a compressor 25 to force a flow of gas into the housing 12 through pipe 21. Since a high pressure environment is desirable in the housing, the housing preferably does not have exhaust fans or outlets dedicated to exhausting gas. If desired, the housing pressure can be controlled by introducing gas into pipe 1, pipe 23, or anywhere in the closed loop system to re-pressurize and maintain the pressure on the pressurized slurry above the vapor pressure of the liquid at the liquid temperature.

To accommodate a high pressure environment, conventional dryers, or for that matter centrifuges as well, are housed in an ASME (or other suitable pressure vessel code) pressure vessel. Preferably, access ports, designed according to applicable pressure vessel codes, are provided to allow for cleaning of the screens, other maintenance or inspections. A suitable shaft sealing mechanism is provided to isolate the high pressure environment inside the pressurized dryer from the surroundings. A gas lubricated, mechanical seal may be the preferred design, but many sealing arrangements could be used. The motor is sized with sufficient available power to turn the rotor in the pressurized dryer or centrifuge.

Once the particles are discharged from the dryer through line 20, they are decoupled from the separation zone by, as illustrated in FIG. 1, ball valve air lock. As noted above, any conventional particle dispensing system for maintaining pressure on one side of a vessel or pipe and discharging the particles to a lower pressure on the other side of the dispenser is suitable. As illustrated, the pressurized dried particles are fed to a first ball valve 26 having a passage 27 in the open position to allow the particles to flow through the passage into the air lock chamber 29. While the particles are filling the air lock chamber 29, the second ball valve 30 remains in the closed position to prevent the pressure on the dried particles from falling below the vapor pressure of the liquid separated in the dryer. At a predetermined level, time, density, weight or any other measure, the first ball valve 26 rotates and seals to the closed position, shutting off the flow of further particles into the air lock chamber and maintaining the pressure on the dried particles in front of the first ball valve 26 above the vapor pressure of the liquid separated off in the dryer. After the first ball valve 26 seals, the second ball valve opens and releases the contents of the air lock chamber to the atmosphere. At this point or thereafter, the pressure on the particles is reduced to below the vapor pressure of the liquid separated in the dryer and is effectively decoupled from the separation zone. Once the contents of the air lock chamber are voided, the second ball valve rotates to the closed position, following which the first ball valve 26 opens back up to allow more particles to fill the air lock chamber 29. This sequence is continuous.

The particle level in the air lock chamber 29 is not limited. It is desirable to fill the chamber to a height of greater than 80% of the chamber height in order to reduce the volume of air escaping from the system once the second ball valve 30 opens.

If desired, a hold up vessel 31 may be provided between the particle outlet 20 and the first valve of whatever type used to allow the particles to accumulate and provide a continuous flow of particles to the ball valve without any surges in particle flow or to regulate the rate at which the particles are decoupled.

A certain amount of pressure on the particles is lost during each decoupling event where the particles are received into the air lock or the valve and released to the atmosphere. To compensate, a pressure regulator as noted above on the system ensures that a flow of compressed gas is introduced at some point in the system, whether to line 23, in the dryer 10, to line 1, or at any suitable location.

At the point the particles are decoupled from the separation zone, moisture remaining on or in the particles is expected to evaporate or flash, especially if the particles are hot. This evaporation or flashing is acceptable and expected in at least some embodiments of the invention. In contrast to a process in which particles are only separated under pressure and dried after the pressure is reduced to below the vapor pressure of the liquid, a larger volume of moisture remains on the particles during de-pressurization, thereby requiring either a subsequent drying step where external heat energy is applied, typically a convective flow of hot air. Moreover, in such a process, fluid losses to the atmosphere are experienced or fluid recovery equipment is required. And, as mentioned above, the more moisture on the particles which flashes, the greater the heat loss to the particle itself, thereby requiring a corresponding amount of heat energy applied to the particles for subsequent processing.

In a preferred embodiment, the It.V. of the particles in the separation zone is not increased. The particles obtained after decoupling are preferably at their final molecular weight. Thus, there is provided an embodiment where there is provided pressurized thermoplastic polymer particles having a degree of crystallinity of at least 20%, an It.V. of at least 0.70 dL/g, containing a level of liquid moisture, at a temperature of at least 130° C., and under a pressure above atmospheric pressure, and the pressurized particles are decoupled by depressurizing the particles to a pressure of less than 50 psig, and the decoupled particles are packaged into a shipping container, wherein the particles are not polymerized in the solid state prior to being packaged into the shipping container. Preferably, the high It.V. thermoplastic polymer in the range of 0.70 to 1.15 dL/g is produced in the melt phase, and is contacted in the form of particles with a liquid for a time and at a liquid temperature sufficient to induce crystallinity to the particles under a pressure equal to or greater than the vapor pressure of the liquid. The liquid is separated from the particles and the particles are dried under said pressure in a separation zone to produce a stream of dried particles. The dried particles are decoupled from the separation zone, preferably to about atmospheric pressure. The shipping containers are thereafter shipped to a customer or distributor. With the exception of solid state polymerization, the particles may be subjected to numerous additional processing steps in-between any of the expressed steps, such as in-between the decoupling step and the step of packaging the particles into shipping container.

Shipping containers are containers used for shipping over land, sea or air. Examples include railcars, semi-containers, Gaylord boxes, and ship hulls.

The particles are suitable to make a variety of articles, including fibers, pipes, films, sheets and molded articles such as bottles and trays, and in particular water can carbonated beverage bottles.

WORKING EXAMPLE

An experiment was carried out with the objective of centrifugally separating and drying a mixture of water and about polyethylene terephtalate (PET) particles crystallized to about 34-37%. The PET-water mixture contained 0.75% by volume of PET pellets and the mixture was heated to a temperature of 165° C. under a pressure of 155 psia. The PET particles were nearly spherical in shape with a diameter of approximately 2.8 mm and their inherent viscosity was 0.80.

The apparatus consisted of a vertical centrifugal dryer of the type depicted in FIG. 1, running at a rotor speed of 1750 rpm. The PET-water mixture was fed on the side-bottom of the dryer. The water was drained from the dryer to a tank connected to the bottom of the dryer by pipe. The vapor space of the tank and the vapor space of the dryer were connected by pipe in order equalize the pressure between both pieces of equipment. In this pressure equalization pipe high pressure air was injected in order to control the pressure of the system at 155 psia. The dried pellets came out the side-top of the dryer and went into a decoupler where the pressure let down occurred. The decoupler consisted of a Rotary Air Lock (RAL). The PET pellets were discharged from the RAL into a drum at atmospheric pressure and ambient temperature. The temperature of the discharged spherical particles was measured as 132° C. It was assumed that the temperature drop for the pellets from 165° C. to 132° C. was all due to evaporating the un-removed water, and we concluded that the % water on the pellets before decoupling was 2.15% maximum.

What we claim is:

1. A process comprising providing a pressurized slurry comprising thermoplastic synthetic polymer particles in combination with a liquid at a liquid temperature greater than the normal boiling point of the liquid and at a pressure equal to or greater than the vapor pressure of the liquid at the liquid temperature, feeding the pressurized slurry to a separation zone, and within the separation zone:
   a. separating the liquid from the particles,
   b. drying the particles, while under a high pressure equal to or greater than the vapor pressure of the liquid; and
   c. decoupling the particles from the separation zone to produce decoupled particles by depressurizing the particles to a low pressure below the vapor pressure of the liquid at the liquid temperature within the separation zone while maintaining the high pressure on the particles prior to depressurization at above the vapor pressure of the liquid at the liquid temperature; and wherein the particles comprise a condensation polymer comprising a polyester polymer comprising:
   i. a carboxylic acid component comprising at least 80 mole% of the residues of terephthalic acid, derivates of terephthalic acid, naphthalene-2,6-dicarboxylic acid, derivatives of naphthalene-2,6-dicarboxylic acid, or mixtures thereof, and
   ii. a hydroxyl component comprising at least 60 mole% of the residues of ethylene glycol or propane diol,
   based on 100 mole percent of carboxylic acid component residues and 100 mole percent of hydroxyl component residues in the polyester polymer, wherein the temrerature of the decoupled rarticles urjon the decourling is within 60° C. of the temperature of the liquid entering the serararion zone.

2. The process of claim 1, wherein the temperature of the decoupled particles upon the decoupling is within 40° C. of the temperature of the liquid entering the separation zone.

3. The process of claim 2, wherein the temperature of the decoupled particles upon the decoupling is within 20° C. of the temperature of the liquid entering the separation zone.

4. A process comprising providing a pressurized slurry comprising thermoplastic synthetic polymer particles in combination with a liquid at a liquid temperature greater than the normal boiling point of the liquid and at a pressure equal to or greater than the vapor pressure of the liquid at the liquid temperature, feeding the pressurized slurry to a separation zone, and within the separation zone:
   a. separating the liquid from the particles,
   b. drying the particles, while under a high pressure equal to or greater than the vapor pressure of the liquid; and
   c. decoupling the particles from the separation zone to produce decoupled particles by depressurizing the particles to a low pressure below the vapor pressure of the liquid at the liquid temperature within the separation zone while maintaining the high pressure on the particles prior to depressurization at above the vapor pressure of the liquid at the liquid temperature; and wherein the particles comprise a condensation polymer comprising a polyester polymer comprising:
   i. a carboxylic acid component comprising at least 80 mole% of the residues of terephthalic acid, derivates of terephthalic acid, naphthalene-2,6-dicarboxylic acid, derivatives of naphthalene-2,6-dicarboxylic acid, or mixtures thereof, and
   ii. a hydroxyl component comprising at least 60 mole% of the residues of ethylene glycol or propane diol, based on 100 mole percent of carboxylic acid component residues and 100 mole percent of hydroxyl component residues in the polyester polymer, of claim 1, wherein the temperature of the liquid in the slurry fed to the separation zone is at least 120° C., and the temperature of the decoupled particles is greater than 100° C.

5. The process of claim 4, wherein the temperature of the decoupled particles is greater than 100° C.

6. The process of claim 4, wherein the temperature of the liquid in the slurry fed to the separation zone is at least 140° C.

7. A process comprising providing a pressurized slurry comprising thermoplastic synthetic polymer particles in combination with a liquid at a liquid temperature greater than the normal boiling point of the liquid and at a pressure equal to or greater than the vapor pressure of the liquid at the liquid temperature, feeding the pressurized slurry to a separation zone, and within the separation zone:
  a. separating the liquid from the particles,
  b. drying the particles, while under a high pressure equal to or greater than the vapor pressure of the liquid; and
  c. decoupling the particles from the separation zone to produce decoupled particles by depressurizing the particles to a low pressure below the vapor pressure of the liquid at the liquid temperature within the separation zone while maintaining the high pressure on the particles prior to depressurization at above the vapor pressure of the liquid at the liquid temperature; and wherein the particles comprise a condensation polymer comprising a polyester polymer comprising:
    i. a carboxylic acid component comprising at least 80 mole% of the residues of terephthalic acid, derivates of terephthalic acid, naphthalene-2,6-dicarboxylic acid, derivatives of naphthalene-2,6-dicarboxylic acid, or mixtures thereof, and
    ii. a hydroxyl component comprising at least 60 mole% of the residues of ethylene glycol or propane diol, based on 100 mole percent of carboxylic acid component residues and 100 mole percent of hydroxyl component residues in the polyester polymer, and wherein at least centrifugal forces are applied to the particles during at least a portion of the separating and during at least a portion of the drying.

8. A process comprising providing a pressurized slurry comprising thermoplastic synthetic polymer particles in combination with a liquid at a liquid temperature greater than the normal boiling point of the liquid and at a pressure equal to or greater than the vapor pressure of the liquid at the liquid temperature, feeding the pressurized slurry to a separation zone, and within the separation zone:
  a. separating the liquid from the particles,
  b. drying the particles, while under a high pressure equal to or greater than the vapor pressure of the liquid; and
  c. decoupling the particles from the separation zone to produce decoupled particles by depressurizing the particles to a low pressure below the vapor pressure of the liquid at the liquid temperature within the separation zone while maintaining the high pressure on the particles prior to depressurization at above the vapor pressure of the liquid at the liquid temperature; and wherein the particles comprise a condensation polymer comprising a polyester polymer comprising:
    i. a carboxylic acid component comprising at least 80 mole% of the residues of terephthalic acid, derivates of terephthalic acid, naphthalene-2,6-dicarboxylic acid, derivatives of naphthalene-2,6-dicarboxylic acid, or mixtures thereof, and
    ii. a hydroxyl component comprising at least 60 mole% of the residues of ethylene glycol or propane diol, based on 100 mole percent of carboxylic acid component residues and 100 mole percent of hydroxyl component residues in the polyester polymer, wherein the separating of the liquid from the particles forms a separated liquid and at least a portion of the separated liquid is re-circulated directly or indirectly to a feed for the manufacture of said slurry, and wherein the liquid is cooler than the particle temperature during a process for entraining the particles into the liquid.

9. A process comprising providing a pressurized slurry comprising thermoplastic synthetic polymer particles in combination with a liquid at a liquid temperature greater than the normal boiling point of the liquid and at a pressure equal to or greater than the vapor pressure of the liquid at the liquid temperature, feeding the pressurized slurry to a separation zone, and within the separation zone:
  a. separating the liquid from the particles,
  b. drying the particles, while under a high pressure equal to or greater than the vapor pressure of the liquid; and
  c. decoupling the particles from the separation zone to produce decoupled particles by depressurizing the particles to a low pressure below the vapor pressure of the liquid at the liquid temperature within the separation zone while maintaining the high pressure on the particles prior to depressurization at above the vapor pressure of the liquid at the liquid temperature; and wherein the particles comprise a condensation polymer comprising a polyester polymer comprising:
    i. a carboxylic acid component comprising at least 80 mole% of the residues of terephthalic acid, derivates of terephthalic acid, naphthalene-2,6-dicarboxylic acid, derivatives of naphthalene-2,6-dicarboxylic acid, or mixtures thereof, and
    ii. a hydroxyl component comprising at least 60 mole% of the residues of ethylene glycol or propane diol, based on 100 mole percent of carboxylic acid component residues and 100 mole percent of hydroxyl component residues in the polyester polymer, and wherein the process of separating the liquid from the particles is conducted in two stages, a first dewatering stage wherein a bulk of the liquid is separated from the particles and a remaining liquid without the use of centrifugal forces and a second stage wherein at least centrifugal forces are applied to separate the remaining liquid from the particles.

10. A process comprising feeding a pressurized slurry, comprising condensation polymer particles and a liquid, at a liquid temperature greater than the normal boiling point of the liquid, to a separation zone comprising a centrifugal dryer or a centrifuge, and separating the liquid from the particles and drying the particles within the separation zone at a pressure equal to or greater than the vapor pressure of the liquid at the liquid temperature, wherein centrifugal forces are applied to the particles during separation and during drying to produce dried particles and further comprising decouplinq the dried particles from the pressure equal to or greater than the vapor pressure of the liquid at the liquid temperature to a low pressure less than the vapor pressure of the liquid while maintaining the vapor pressure of the particles prior to decoupling equal to or above the vapor pressure of the liquid at the liquid temperature within the separation zone, wherein the particles comprise polyester polymers, and the liquid comprises water, and the It.V. of the particles is at least 0.70 dL/g, and wherein after the particles are decoupled to the low pressure, the particles are directly or indirectly packaged into a shipping container without solid state polymerizing the particles prior to being packaged into the shipping container.

11. A process for manufacturing packaged particles comprising providing pressurized thermoplastic polymer particles having a degree of crystallinity of at least 20%, an It.V. of at least 0.70 dL/g; containing a level of liquid moisture, at a temperature of at least 130° C.; and under a pressure above atmospheric pressure; decoupling the pressurized particles by depressurizing the particles to a pressure of less than 50 psig to produce decoupled particles; and packaging the decoupled particles into a shipping container, wherein the particles are not polymerized in the solid state prior to being packaged into the shipping container.

12. The process of claim 11, wherein the particles comprise polyester polymer particles.

13. The process of claim 12, wherein the polyester polymer has an It.V. ranging from 0.70 to 1.15 dL/g obtained in a melt phase polymerization, and is contacted in the form of particles with a liquid for a time and at a liquid temperature sufficient to induce at least 20% crystallinity to the particles under a pressure equal to or greater than the vapor pressure of the liquid.

14. The process of claim 13, wherein the liquid is separated from the particles and the particles are dried under said pressure in a separation zone to produce a stream of dried particles, and the dried particles are decoupled from the separation zone.

15. The process of claim 11, wherein the pressurized particles are at a pressure of at least 50 psig.

16. The process of claim 15, wherein the pressurized particles are at a pressure of at least 75 psig.

* * * * *